Patented Nov. 14, 1939

2,179,909

UNITED STATES PATENT OFFICE 2,179,909

REFINING OF HYDROCARBON OIL WITH MIXED SOLVENTS

James W. Weir, Los Angeles, Calif., assignor, by mesne assignments, to Edeleanu Gesellschaft m. b. H., Berlin, Germany, a corporation of Germany No Drawing. Original application June 8, 1936, Serial No. 84,164. Divided and this application August 27, 1938, Serial No. 227,213

17 Claims. (Cl. 196—13)

This invention relates to the art of refining hydrocarbon oils for the purpose of removing from the oil hydrocarbon constituents of relatively low viscosity index and producing thereby refined oils of high viscosity index.

In the refining of lubricating oil by solvent extraction, the oil and solvent are mixed in such proportions as to give two different phases, the one consisting mainly of paraffinic oil, in which a small percentage of the selective solvent is dissolved; and the other consisting largely of solvent in which the naphthenic and aromatic fractions of the lubricating stock are in solution.

After these two phases are agitated sufficiently to insure equilibrium or until there is no further exchange of components between phases, the mixture is passed into a quiescent settling zone for the purpose of permitting stratification to occur so that respective phases may be decanted or withdrawn with as little contamination with the other phase as possible under practical conditions.

I have observed the conditions existing in the settling chamber when employing all of the selective solvents commonly used, such as sulfur dioxide, sulfur dioxide-benzene, chlorex, phenol, furfuraldehyde, nitrobenzene, and many other experimental solvents, and have noted that in the case of each of the aforementioned solvents, the extract constitutes the continuous phase, whereas the raffinate is in the form of the dispersed phase. In other words, at the completion of the mixing period and the beginning of the settling period, the raffinate or oil phase is emulsified or dispersed in the solvent phase and the mechanism of settling or stratification into two layers corresponds to the rising upward and agglomeration of the raffinate droplets.

I have observed that for the process of raffinate separation to go to completion under these circumstances very long periods of settling time are required and in the design and operation of commercial solvent treating plants, it is extremely doubtful whether perfect settling of the raffinate out of the extract layer is ever accomplished. The larger droplets of raffinate generally rise or settle upward out of the extract layer at a fairly rapid rate, but on account of the fact that the rate of settling is generally proportional to the square of the diameter of the particles being settled, it is easy to understand why the very small sized droplets of raffinate require longer times for settling out of the extract than can be allowed in commercial practice. The net result is a certain amount of loss of raffinate or paraffinic constituents along with the extract phase, simply on account of mechanical contamination, in addition to any losses which may be experienced on account of true solution of the paraffinic constituents in the extract layer. This loss may amount to as much as 15 to 20% of the final yield of raffinate. As a remedy for this situation, I have devised the following principle which I have found to be operable.

Briefly, this new principle consists in choosing a suitable solvent and treating conditions which will reverse the order of the phases going to the settling zone so that the raffinate or oil phase constitutes the continuous phase and the solvent or extract phase is the one which is dispersed. The process of settling then consists of the dispersed particles of extract phase agglomerating and settling out of the raffinate. In other words, the only manner in which a distinct layer of extract phase can appear is for droplets of extract phase to agglomerate to give a continuous layer of uniform composition. In this manner it is impossible for the extract layer to contain raffinate entrained. Therefore when the extract layer is removed from the settling zone, there is absolutely no danger of withdrawing even a small amount of raffinate. If from practical considerations only a limited settling time is allowed, the raffinate phase will be contaminated with a small amount of dispersed extract phase, but on account of the fact that the extract phase represents more or less dilute solutions of naphthenic fractions in solvent, the only harmful result which can be experienced is the failure to obtain the full degree of refinement which would be obtained if the settling of the two phases were one hundred percent perfect. While properly adjusting treating conditions and solvent ratios, the required degree of refinement can be obtained and the deleterious effect of contamination of the raffinate with a small amount of the extract phase can be reduced to a negligible quantity.

In other words, by utilizing the novel principle of making the extract the dispersed phase rather than the continuous phase in solvent extraction, I am able to prevent losses of raffinate along with the extract and thereby obtain a very substantial improvement in yield.

As a practical example of the operation of this principle, I have found that I can use pyridine in contact with an aqueous solution of alkali, such as sodium or potassium hydroxide. In the presence of aqueous alkali, a very unexpected phenomenon occurs. After the mixture of solvent, oil, and alkali is thoroughly mixed to insure equilibrium between phases, and the mixture is then passed into the settling zone, the separation of phases is rather slow for a few moments and then there is a rather rapid movement of the droplets of the solvent phase, followed by agglomeration of these droplets into a continuous layer of uniform composition, free from entrained raffinate. With additional settling time, the raffinate layer is almost entirely free of entrained extract and alkali, and I then have three distinct layers: namely, the oil or raffinate layer containing only a smal amount of minutely dispersed extract phase, a homogenequs, continuous extract phase, and an aqueous alkali phase. The settling vessel is arranged for the continuous introduction of the equilibrium mixture and decantation of the three layers at appropriate levels. The raffinate layer is then passed up to the next treating stage, while the extract layer is passed down to the next treating stage in the conventional countercurrent system of solvent treating. The aqueous alkali phase may be passed either up or down the system or returned to the mixer connected with the same settling stage. The mechanism of the phenomenal behavior obtained with the solvent in the presence of aqueous alkali has not been definitely established and I do not wish to limit my invention to any theory, but it appears probable that I have been successful through the use of the aqueous alkali in changing the surface tension relationships to cause the desired reversion of phases in the equilibrium solvent-oil mixtures going to the settlers.

As an example to illustrate the efficiency of the results obtained, a sample of dewaxed California Santa Fe Springs distillate, classified as an S. A. E. 20 stock, having an A. P. I. gravity of 19.8 and 74 seconds Saybolt Universal viscosity at 210° F. was agitated with two volumes of pyridine at 70° F. The solvent and oil were found to be entirely miscible and no phase separation could be obtained. The mixture was then divided into two parts which were treated as follows: To the first part about 5% of water, based on pyridine content of the mixture, was added with additional agitation. This mixture then showed a separation of two phases with the usual condition of the raffinate phase being emulsified or dispersed in the solvent phase. Settling under these conditions required the usual long periods of time for efficient phase separation. To the other portion of the mixture, 5% of aqueous sodium hydroxide solution containing approximately 10% by weight of alkali, was added with agitation and the mixture allowed to remain quiescent. It was immediately evident that the raffinate was now the continuous phase and that the extract phase was dispersed therein. Within less than a minute, however, the extract phase began to agglomerate and settle out so that after only ten or fifteen minutes' total settling time the extract phase could be separated practically quantitatively. The gravities and yields of oil obtained under the two conditions were 68% and 25.2 gravity raffinate with the experiment with water only, and 76% of 25.1 gravity raffinate when alkali was used.

I have found that many selective solvents can be made to behave or function like pyridine by the addition of pyridine, or by blending same with selective solvents, such as nitrobenzene, aniline, chloraniline and others, whereby the solvent blend is given improved properties over its components. In order to simplify the language of this specification, those solvents like nitrobenzene, aniline, chloraniline and others, which are susceptible to phase reversal by addition of sufficient caustic solution to form a separate caustic phase, particularly when used in the presence of pyridine, are hereinafter designated as "auxiliary selective solvents."

For example, if pyridine is added to or blended with such auxiliary selective solvents, the resultant mixture will not cause phase separation with the oil but will behave like dry pyridine, that is it will dissolve the oil entirely without stratification under working conditions as herein described.

Furthermore, such mixtures of auxiliary selective solvents and pyridine will take on most of the characteristics of pyridine. Certain other benefits of the use of such mixtures, in fractionating hydrocarbon oils by stratification will also be shown. An advantage to be derived therefrom, in dewaxing hydrocarbon oil is, for instance, the improvement in filter rate as described in my parent application S. N. 84,164, filed June 8, 1936.

I have also observed that other selective solvents can be made to behave like pyridine in the presence of aqueous alkali, particularly when such solvents are blended with pyridine. For example, nitrobenzene, aniline, chloraniline and many other conventional selective solvents become susceptible to reverse the state of emulsion when blended with pyridine and aqueous alkali. The ratio of such solvent to pyridine may be varied over wide limits without impairing this characteristic.

While pyridine and aqueous alkali produce a complete break of the two oil phases and of the alkali phase within a relatively short time, it was observed that the above auxiliary selective solvents accelerate and improve further the stratification of all three phases. This no doubt is due to the higher specific gravity of these compounds relative to pyridine.

Nitrobenzene, as is well known to those skilled in the art of solvent refining, is a very effective selective solvent. High quality raffinates can be produced when using this solvent with a comparatively small solvent-oil ratio. However, the yield of finished raffinate is rather low when comparing nitrobenzene treatment with other selective solvents of the conventional type wherein the raffinate emulsifies in the extract phase. Pyridine when applied in the presence of aqueous alkali gives considerably higher yields, based upon the same degree of refinement, than any of the conventional solvents, but requires (relative to such solvents, as for example, nitrobenzene, aniline, chloraniline, etc.) larger quantities of solvent.

I have observed that very efficient blends of nitrobenzene, aniline, etc., with pyridine can be prepared to be used for solvent extraction of hydrocarbon oils in the presence of aqueous alkali and they have all advantages and none of the disadvantages of their individual components.

As an example I have found that such blended solvents require about one-half the amount of total solvent to attain a specific degree of refinement as compared to pyridine by itself while the same high yields of finished raffinate are obtained as would be the case were pyridine used exclusively. It is understood, however, that such blended solvents are applied simultaneously with aqueous alkali as has been explained in detail.

The following experimental data shall serve to illustrate this point. A vacuum distilled, dewaxed, overhead lube oil stock of 22.3° A. P. I. gravity required 190 vol.% of nitrobenzene to produce a 28.5° A. P. I. gravity raffinate with a yield of 42%.

The same degree of refinement using pyridine and aqueous alkali was attained using 380 vol.% of pyridine, based upon the oil charged, with a yield of 54.5%.

A blend of 40% nitrobenzene+60% pyridine when applied to the oil in contact with aqueous alkali, required 200 vol.% of solvent to produce a 29° A. P. I. gravity raffinate with a yield of 53.8%.

The extractions in all cases were carried out in two steps, using equal volumes of solvent in each step.

Extractions with mixed solvents were carried out as follows:

*1st extraction.*—40% nitrobenzene+60% pyridine using a 1 to 1 solvent oil ratio.

*2nd extraction.*—Using pyridine only.

This procedure was adopted for the following reason:

Many solvents, particularly nitrobenzene and aniline, show a tendency to discolor the raffinate during solvent recovery operations. It is conventionally assumed that this phenomenon is due to the formation of dye-compounds, in the above cited case, as probably aniline-black, formed by reduction of nitrobenzene. While nitrobenzene is not readily reduced, it is susceptible to reduction to aniline which in turn will show a great tendency to discolor the oil at higher temperatures.

I have observed that such discoloration can be avoided when conducting the final extraction with pyridine. To all appearances, the pyridine removes the nitrobenzene or aniline into the extract phase leaving thereby the raffinate essentially free of such color detrimental reagents.

As part of my invention I intend to contact the "mixed-solvent refined oil" in its final step of treatment with pyridine exclusively for the purpose of selectively removing such solvent components as are detrimental to color during solvent recovery topping operations. This final pyridine treating step may be accomplished in any convenient manner, for example, by means of a countercurrent treating tower. When using more stable auxiliary selective solvents, for example, chloraniline, the extraction may be carried to completion with the solvent blend but in any event a pyridine wash may be applied if such solvents contain contaminations of color forming constituents.

I have further observed that all solvents that are susceptible to reversal of emulsion as described herein and also all auxiliary selective solvents when applied in the presence of aqueous alkali produce a markedly light colored raffinate that may require no clay treatment whatsoever. Blank runs without any aqueous alkali produced mostly opaque raffinates and as part of my invention I claim the removal of color bodies or intermediate color forming constituents into the extract phase, leaving a light colored raffinate that requires no further treatment for improvement of color.

While it is convenient and efficient to use nitrobenzene or aniline as auxiliary selective solvents together with pyridine, I prefer to use chloraniline since this compund is the most stable and shows a slightly more favorable color improvement of the finished raffinate.

Many modifications in regard to the use of auxiliary selective solvents together with pyridine in the presence of a distinct caustic layer may be made by those skilled in the art without deviating from the basic principle of this invention.

I have also found that substituted pyridines such as, for example, methyl pyridines or picolines, may be used instead of pyridine; further all aliphatic amines can serve the purpose of emulsion reversal and/or may be substituted for pyridine.

In the claims, I use the term "pyridine-type solvent" to refer generally to the solvents applicable to my process as described above, namely, pure or commercial pyridine alone, or homologues of pyridine (such as methyl pyridine) or aliphatic amines, and blends of these substances with each other.

This application is a division of my copending application Serial No. 84,164, and a continuation in part of my application Ser. No. 84,163, both filed on June 8, 1936, and having now matured into Patents Nos. 2,154,190 and 2,154,189, respectively, both dated April 11, 1939.

I claim:

1. The process of separating high viscosity index from low viscosity index components of petroleum oil which comprises contacting the oil with a mixture of a pyridine type solvent and an auxiliary selective solvent which does not react with alkali, in the presence of an aqueous alkali metal hydroxide solution in sufficient amount to form three phases, causing the extract phase to be dispersed in a continuous raffinate phase, then separating and separately removing raffinate phase, extract phase and alkali metal hydroxide phase.

2. In the refining of hydrocarbon oil with a solvent mixture comprising a pyridine type solvent and an auxiliary selective solvent by which a fraction of relatively high viscosity index is separated as a raffinate liquid phase and another fraction of relatively low viscosity index is separated as an extract liquid phase, the step of adding to the oil and solvents undergoing treatment an aqueous alkaline substance capable of existing as a separate layer in equilibrium with the oil and solvents in sufficient amount to form a third phase, thereby causing the extract to be dispersed in a continuous raffinate phase.

3. The method of refining a hydrocarbon oil with a solvent mixture comprising a pyridine type solvent and an auxiliary selective solvent, in the presence of a sufficient quantity of an aqueous alkali metal hydroxide solution which is chemically unreactive with the solvents to form a separate layer upon separation of phases.

4. In the method of refining hydrocarbon oil with a solvent mixture comprising a pyridine type solvent and an auxiliary selective solvent which does not react with alkali, the addition of a sufficient quantity of an aqueous alkali metal hydroxide solution to form a separate layer upon separation of phases and when in contact with the oil and solvents, to cause a reversal of the natural order of the phases in the treating zone so that the raffinate oil phase constitutes the continuous phase and the solvent extract phase is dispersed in said continuous phase before separation.

5. The method of refining hydrocarbon oil which comprises contacting the oil with a solution of an alkali metal hydroxide, and simultaneously contacting the oil with a solvent mixture comprising a pyridine type solvent and an auxiliary selective solvent with which said alkali metal hydroxide does not react chemically and which is capable in the proportions and at the temperature used, of separating the oil without reacting chemically therewith into a fraction of relatively high viscosity index and a fraction of relatively low viscosity index.

6. A process as claimed in claim 1 in which the auxiliary selective solvent is nitrobenzene.

7. A process as claimed in claim 1 in which the auxiliary selective solvent is aniline.

8. A process as claimed in claim 1 in which the auxiliary selective solvent is a chloraniline.

9. The process of separating high viscosity index from low viscosity index components of petroleum oil which comprises contacting the oil with a mixture of a pyridine type solvent and an auxiliary selective solvent which does not react with alkali, in the presence of an aqueous alkali metal hydroxide solution in sufficient amount to form three phases, causing the extract phase to be dispersed in a continuous raffinate phase, then separating and separately removing raffinate phase, extract phase and alkali metal hydroxide phase, extracting the raffinate phase further with a pyridine type solvent in order to thereby remove the auxiliary selective solvent from said raffinate phase and recovering from the latter the pyridine type solvent by distillation.

10. The method of refining hydrocarbon oils comprising dissolving the oil in a pyridine-type solvent, blending said mixture with an auxiliary selective solvent, which does not react chemically with alkali, in such proportion that no phase separation can occur at the desired extraction temperature, contacting the solvent oil mixture with an aqueous solution of alkali, producing thereby a system of essentially three phases, namely an aqueous alkali solution, an extract and a raffinate solution, then separating the raffinate from the extract and alkali solutions and recovering the solvent from said solutions.

11. The method of refining hydrocarbon oils according to claim 10 in which the auxiliary selective solvent is nitrobenzene.

12. The method of refining hydrocarbon oils according to claim 10 in which the auxiliary selective solvent is aniline.

13. The method of refining hydrocarbon oils according to claim 10 in which the auxiliary selective solvent is a chloraniline.

14. The method of refining hydrocarbon oils comprising dissolving the oil in a pyridine-type solvent, blending said mixture with an auxiliary selective solvent, which does not react chemically with alkali, in such proportion that no phase separation can occur at the desired extraction temperature, contacting the solvent oil mixture with an aqueous solution of alkali, producing thereby a system of essentially three phases, namely an aqueous alkali solution, an extract and a raffinate solution, separating the extract and alkali solutions from the raffinate solution and extracting the latter further with a pyridine-type solvent in order to thereby remove the auxiliary selective solvent from said raffinate solution and recovering from the latter the pyridine-type solvent by distillation.

15. The method of refining hydrocarbon oils according to claim 14 in which the auxiliary selective solvent is nitrobenzene.

16. The method of refining hydrocarbon oils according to claim 14 in which the auxiliary selective solvent is aniline.

17. The method of refining hydrocarbon oils according to claim 14 in which the auxiliary selective solvent is a chloraniline.

JAMES W. WEIR.